June 13, 1944.  C. S. ASH  2,351,180
BRAKE MECHANISM
Filed Oct. 22, 1941  6 Sheets-Sheet 4

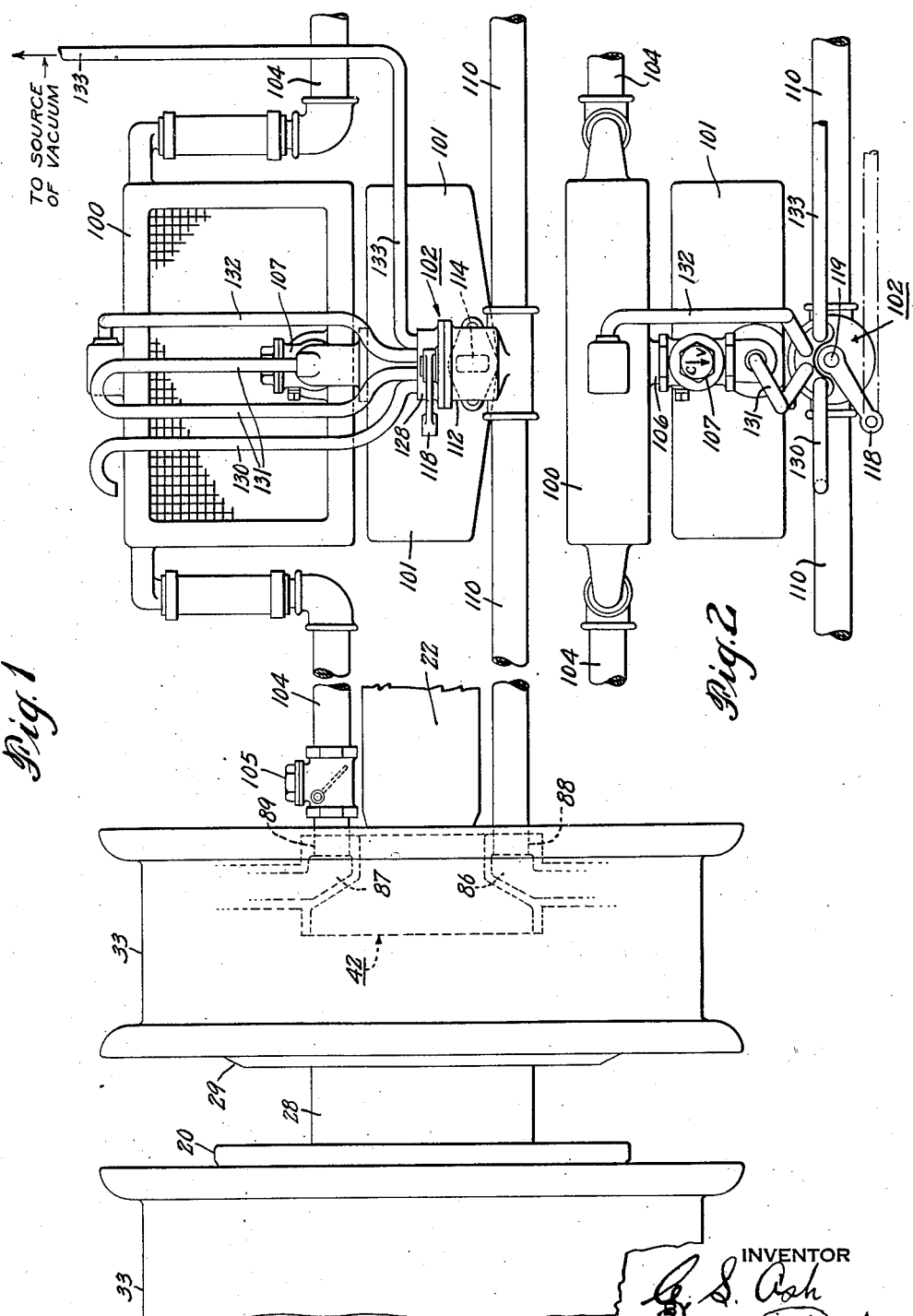

INVENTOR
C. S. Ash
Morgan Finnegan & Durham
ATTORNEYS.

June 13, 1944. C. S. ASH 2,351,180
BRAKE MECHANISM
Filed Oct. 22, 1941 6 Sheets-Sheet 5

INVENTOR
C. S. Ash
BY
Morgan, Finnegan and Durham
ATTORNEYS

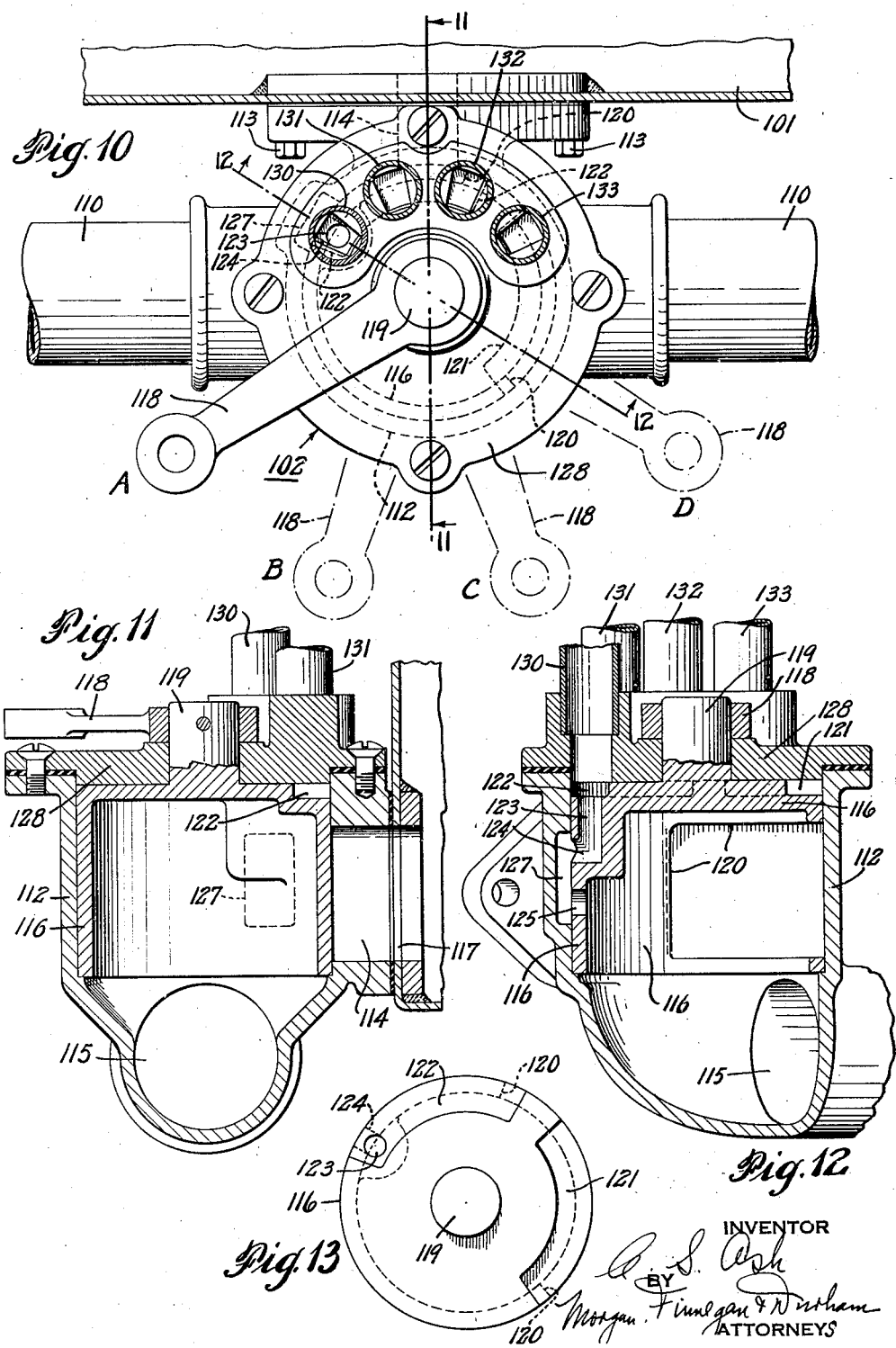

Patented June 13, 1944

2,351,180

UNITED STATES PATENT OFFICE 2,351,180

BRAKE MECHANISM

Charles S. Ash, Milford, Mich.

Application October 22, 1941, Serial No. 416,042

14 Claims. (Cl. 188—18)

The present invention relates to dual wheel and brake assemblies and particularly those adapted for use with automotive road vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a schematic view of an illustrative embodiment of the present invention showing a pair of side by side independently rotatable dual wheels, and the cooling, reservoir, control and communicating means of fluid service brakes for the wheels;

Fig. 2 is a plan view of the fluid brake cooling, reservoir and control means shown in Fig. 1;

Fig. 10 is a plan view in greater detail of the fluid brake control means shown in Figs. 1 and 2;

Fig. 11 is a section of the fluid brake control means taken along line 11—11 of Fig. 10;

Fig. 12 is a sectional view taken along line 12—12 of Fig. 10; and

Fig. 13 is a plan view of the valve core for the fluid brake control means.

Figure 3:
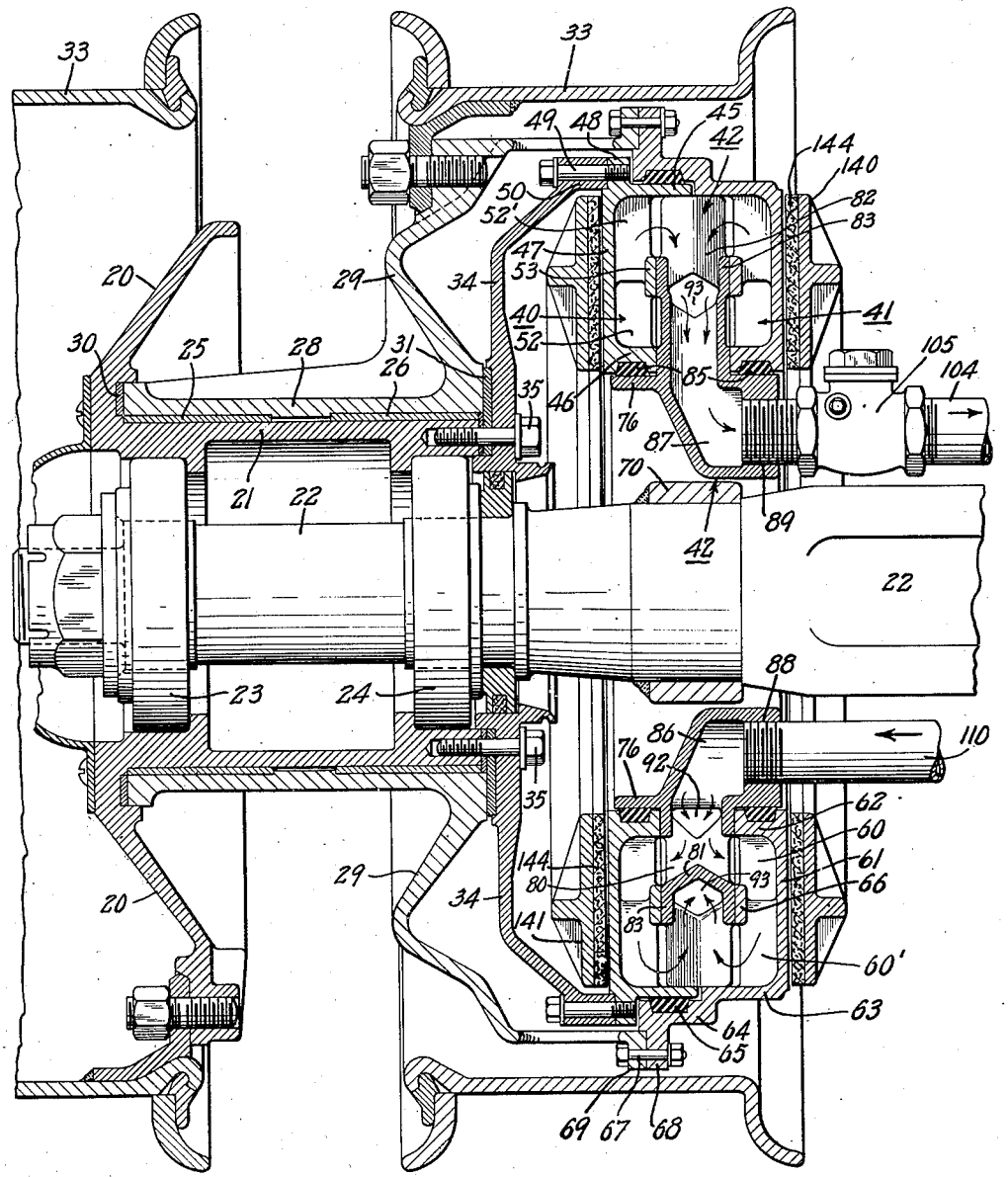
Fig. 3 is an axial sectional view of an illustrative embodiment of the present invention taken along line 3—3 of Fig. 4, showing a pair of independently rotatable dual wheels of the trailing type equipped with fluid service brakes and disc type friction brakes.

The present invention has for its object the provision of a novel and improved dual wheel assembly having improved braking means for the wheels. A further object is to provide such a wheel assembly in which the dual wheels are independently rotatable with braking means the action of which on the respective wheels is always equalized, and which is capable of exerting an entirely sufficient braking effort upon the wheels of the largest and most heavily loaded wheel assembly with absolute reliability and a minimum of wear in the parts of the assembly. The invention provides fluid braking means for the wheels of an independently rotatable dual wheel assembly wherein the braking effort for the respective wheels is separately and equally applied but commonly actuated, and in which the deterioration of parts is negligible regardless of the extent of use thereof. The invention further provides braking means for vehicle wheels which obviate entirely the problems of heat generation and dissipation attendant upon the use of conventional friction brakes. The invention will be found particularly useful when applied to vehicles adapted to carry heavy loads such as trucks, trailers and buses in providing ample, safe and efficient brakes for the vehicle wheels which may be utilized for braking down long grades without the punishing and destroying wear and danger of failure which is attendant upon such use of conventional brakes. A further object is to provide fluid brakes for vehicle wheels with cooling and control means for insuring the correct and desired operation of the brakes. Still another object of the invention is to provide a dual wheel assembly having independently rotatable dual wheels with auxiliary braking means for use with fluid service brakes, the auxiliary braking means exerting an independent and balanced braking effort upon the respective wheels.

As illustratively shown in the accompanying drawings the invention is applied to a pair of independently rotatable side by side dual wheels. The wheels are illustratively shown as non-dirigible, non-driven wheels, but the invention is applicable to other types of wheels.

In accordance with the present invention a pair of independently rotatable dual wheels are mounted for rotation on the vehicle axle end, One of the wheels is suitably mounted for rotation by means of an elongated hub upon the axle end, and the other wheel is mounted for free independent relative rotation upon the hub of the first wheel. Fluid braking means are provided for the dual wheels and these means comprise, generally, a pair of vaned members one attached to each wheel for rotation therewith and arranged on either side of a stationary vaned member anchored to the vehicle axle, the three vaned members forming a fluid tight casing enclosing the vanes. Inlet and outlet fluid ports are provided in the central, stationary vane carrying member, and the vanes of that member are so constructed and combined with a baffle plate that fluid entering the inlet port and seeking the outlet port by reason of pressure difference and circulation is required to enter the rotatable vaned members on either side and contact the moving vanes before returning to the central member and the outlet port. Between the outlet and inlet ports the fluid is circulated by suitable conduits through a radiator for the dissipation of heat generated in the vaned chamber during application of the brakes and through a reservoir to provide for an available and instantaneous supply of fluid for the brakes, and control means for the brakes are provided between the reservoir and the inlet port. These control means comprise valve means to restrict or permit the flow of fluid into the vaned chamber, and valve means for selectively connecting free air and vacuum to various parts of the fluid circulating system to rapidly fill and exhaust the vaned chamber and to control the flow of fluid in the circulating system.

Auxiliary friction brakes are provided for the wheels in addition to the fluid brakes, and these brakes comprise a pair of flat annular brake shoe rings which are anchored to the vehicle axle and each of which is movable into and out of frictional engagement with a respective rotating vaned member, those members being provided with finished outer surfaces for this purpose.

It will be understood that the foregoing general description and the following detailed description as well are exemplary and explanatory of the invention but are not restrictive thereof.

Referring now in detail to the embodiment of the invention illustratively shown in the accompanying drawings, the invention is shown as applied to a set of independently rotatable non-driven or trailing dual wheels. The outer wheel 20 is provided with an integral hub portion 21 (Fig. 3) which extends inwardly for a considerable distance and is mounted for rotation with respect to the axle 22 by means of bearings 23, 24. The outer portion of the hub 21 is cylindrical and forms a bearing surface for the bushings 25, 26 which are seated in the interior of the cylindrical outer hub 28, at the inner end of which is the integral inner wheel 29. Thrust bearings 30, 31 are provided to take the thrust load between the inner and outer wheels 20, 29 while their independent rotation is permitted by the bushings 25, 26.

Each of the wheels 20 and 29 is provided with a suitable tire mounting rim 33 secured to its respective wheel in any desired manner. The inner wheel 29 is maintained in its proper axial relation with respect to the outer wheel 20 by means of a disc-like flange or plate 34 bolted to the inner end of the inner hub 21 by means of cap screws 35.

Figure 5:
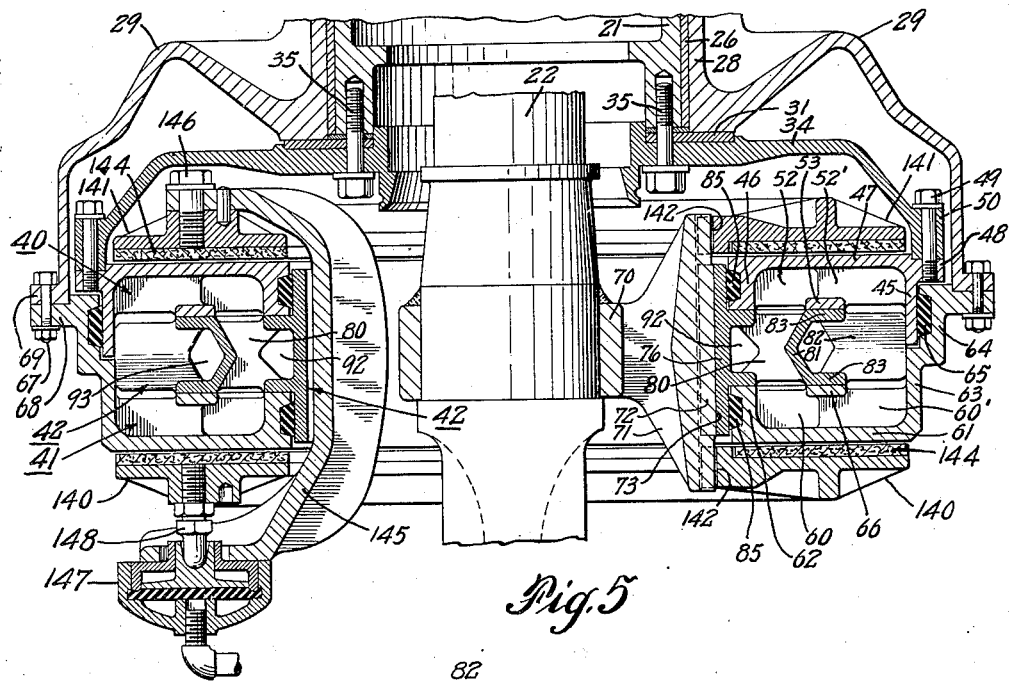
Fig. 5 is an axial sectional view taken along line 5—5 of Fig. 4.

The fluid brakes for the wheels 20, 29 as illustratively shown in the drawings are located on the inner side of the inner wheel 29, and comprise a pair of rotatable vaned members indicated generally with the numerals 40 and 41 and a stationary vaned member indicated generally as 42 (Figs. 3 and 5).

Figure 8:
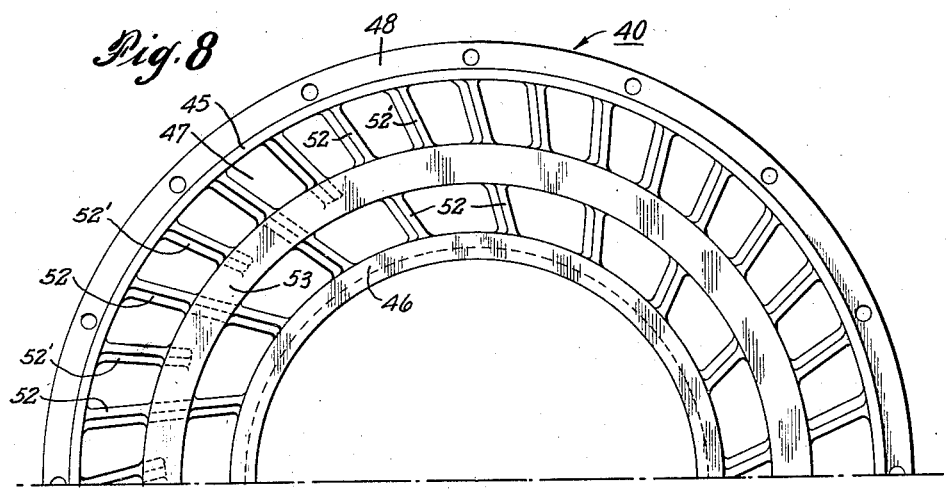
Fig. 8 is a side view of one of the rotatable vaned members of the fluid brake shown in Fig. 3, the view being from the inside of the member.
Figure 9:
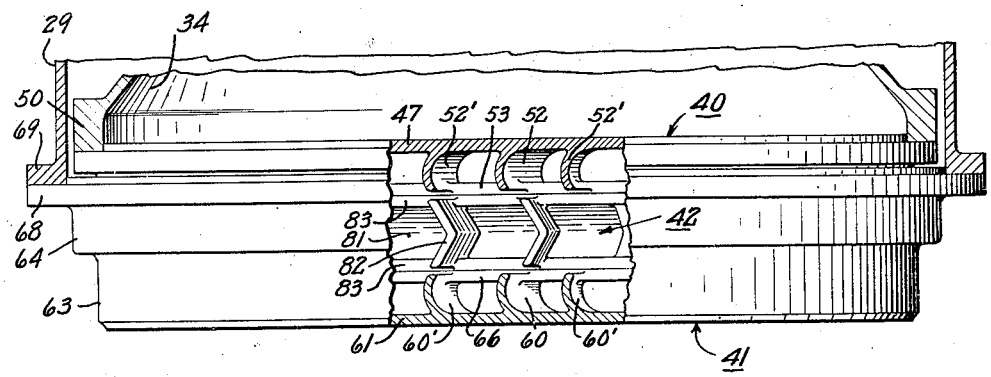
Fig. 9 is a plan view of the brake housing of the fluid brakes shown in Fig. 3, certain parts being broken away and certain other parts being shown in cross section.

The rotatable vaned member 40 is formed with an outer cylindrical surface 45 and an inner coaxial cylindrical surface 46 of lesser diameter and these cylindrical surfaces are jointed by an integral flat annular ring 47, the outer surface of which is finished to form the drum portion of a friction brake as hereinafter described. The vaned member 40 is mounted for coaxial rotation with the outer wheel 20 by means of an integral outwardly extending peripheral flange 48 which receives stud bolts 49 passing through the enlarged peripheral portion 50 of flange 34. As may be seen in Figs. 8 and 9, a plurality of curved vanes 52 extend axially inwardly from the annular plate portion 47 of the vaned member 40, and are supported and jointed at their inner edges by the narrow annular ring 53. The curved vanes 52 extend the radial width of the annular plate 47, and half-length vanes 52' are alternately positioned between the full-length vanes 52, as shown in Fig. 8.

The rotatable vaned member 41 for the inner wheel is similar in construction to the member 40 just described, having a plurality of alternate full and half-length cupped vanes 60, 60' respectively, extending axially from the flat annular plate 61 which joins the inner cylindrical portion 62 and the outer coaxial cylindrical portion 63 of greater diameter. The latter cylindrical portion is formed at its outer end with a cylindrical extension 64 of slightly greater diameter than the cylindrical member 45 to surround and have a fluid tight slipping engagement with that member by means of a sealing ring 65 which is positioned in an annular groove in extension 64. A narrow annular ring 66 joins and supports the curved vanes 60, 60', and the vaned member 41 is mounted for coaxial rotation with the inner wheel 29 by means of bolts 67 which attach a radially extending annular flange 68 of the vaned member to a cylindrical extension 69 of the inner wheel.

The stationary vaned member 42 of the fluid brakes is provided with inlet and outlet ports for the charging and exhausting of the brakes with fluid, and is so constructed that incoming fluid is required to flow into the adjacent rotatable vaned members 40, 41 before it has access to the outlet port. The fluid is thus forced into contact with the vanes of those rotatable members and a retarding force upon their rotation is effected.

Figure 4:
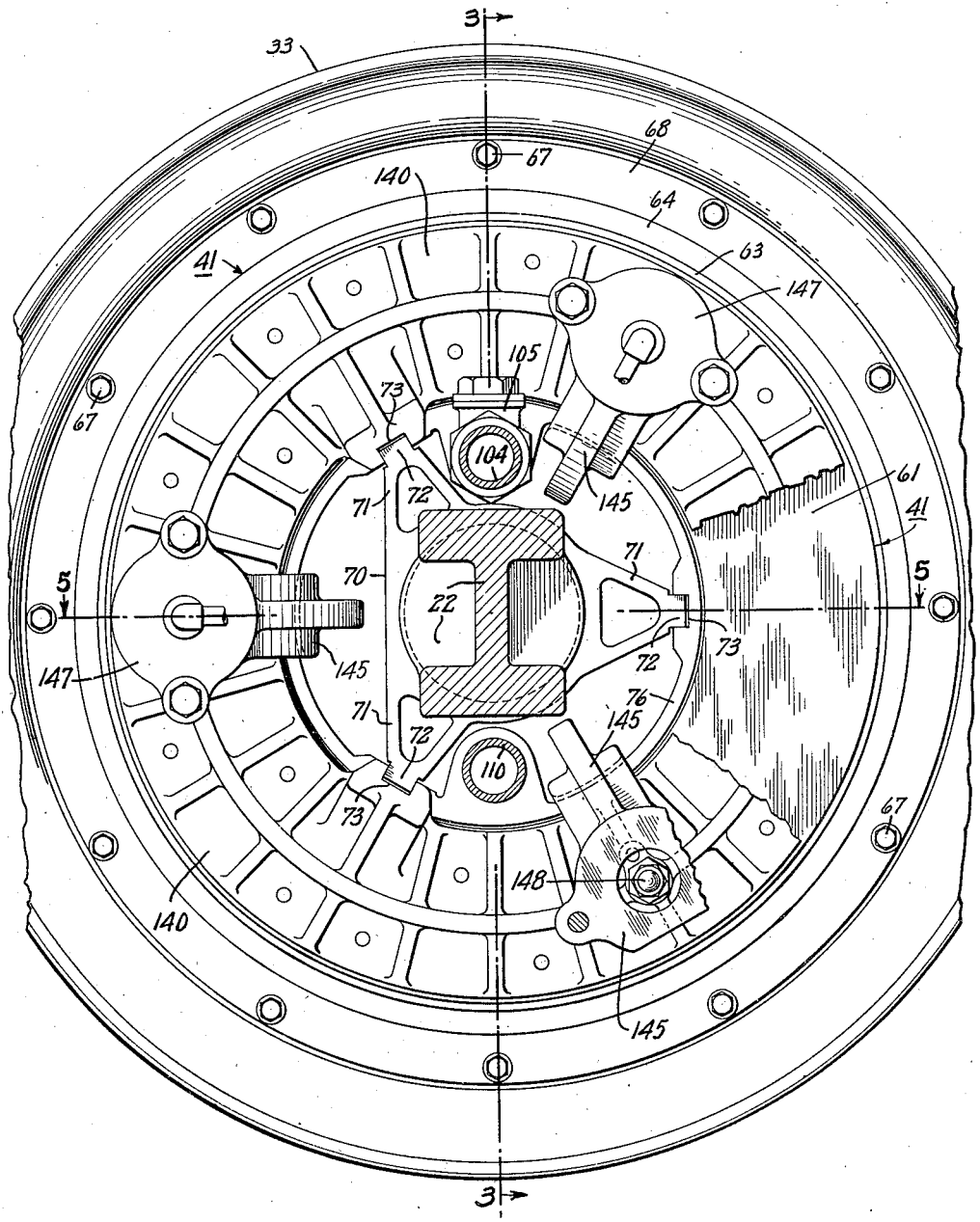
Fig. 4 is a side view of the dual wheel assembly shown in Fig. 3, certain parts being broken away and other parts being omitted for greater clarity.

As shown in Figs. 4 and 5, the stationary vaned member 42 is mounted on the vehicle axle 22 by means of a triangular spider 70 which is anchored to the axle, and the arms 71 of which carry integral axially extending rectangular bars 72 which are seated in cooperating axially extending grooves 73 in the annular base portion 76 of member 42. The stationary vaned member 42 is thus held against rotation with respect to the axle 22, but axial movement upon the spider 70 is permitted.

Figure 6:
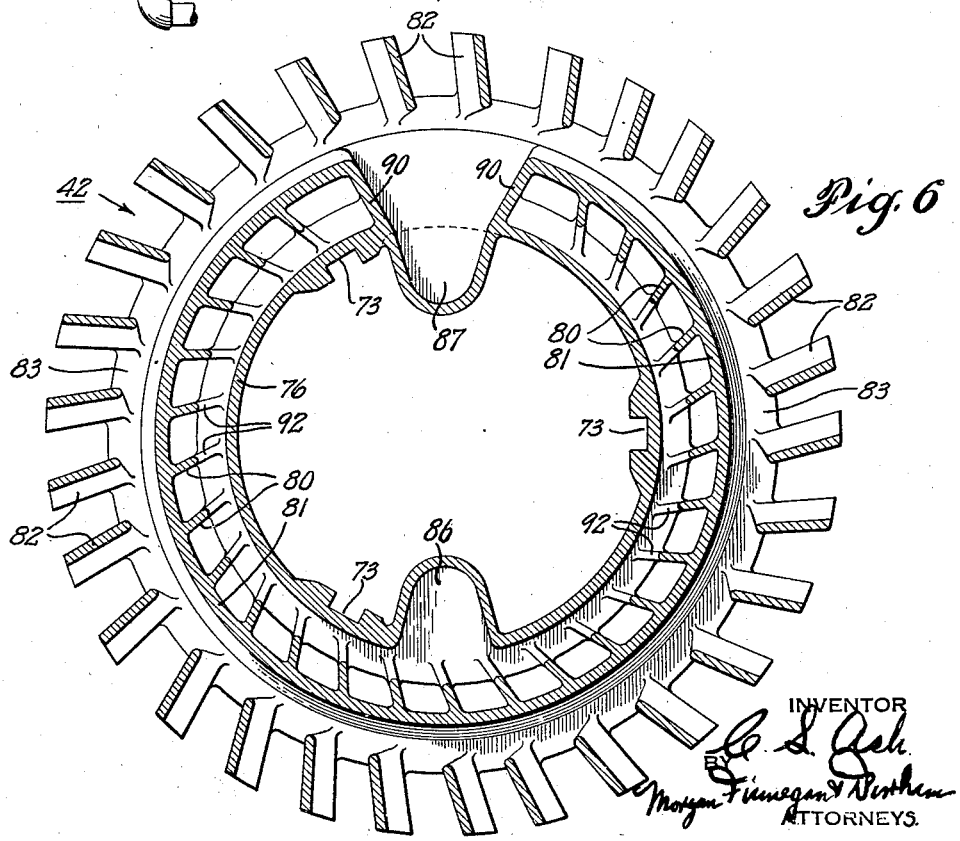
Fig. 6 is a transverse cross sectional view, taken through the center, of the stationary vaned member, forming a part of the fluid brakes shown in Fig. 3.
Figure 7:
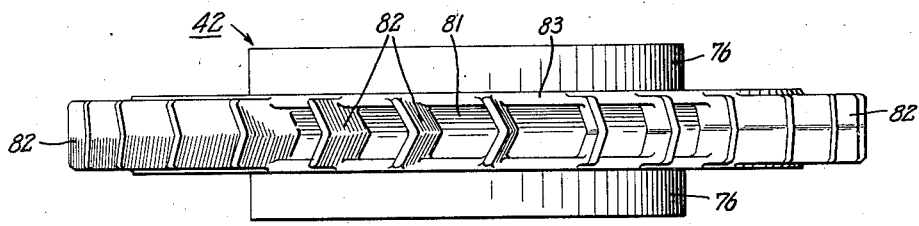
Fig. 7 is a plan view of the member shown in Fig. 6.

As may be seen in Fig. 6, a plurality of radially extending inner vanes 80 are mounted on the annular base portion 76 of member 42, and these vanes at their upper ends meet and are integral with an annular baffle plate 81 of V-cross section (Fig. 5), which supports the radially extending outer vanes 82. The baffle plate 81 is formed with a pair of flat annular rings 83 extending radially from either edge and these rings face with the annular rings 53 and 66 of the rotating wheel vaned members 40 and 41 respectively and serve to support and strengthen the outer vanes 82 of the stationary vaned member as well as to properly space apart the respective vanes of the fluid brake members 40, 41, 42 and to take axial thrusts between those members should any occur. Such axial thrust is taken in the main by thrust bearings 30, 31 and ordinarily no thrust will be exerted between members 40, 41 and 42, but in case of looseness occurring in those bearings through wear the rings 83, 53 and 66 are available to protect the fluid braking unit from damage and act as thrust bearings. A pair of sealing rings 85 are positioned on the base portion 76 on either side of the radially extending vanes 80, and these rings seat in annular grooves provided in the cylindrical walls 46, 62 of the rotating vaned members 40, 41 respectively, the three vaned members 40, 41, 42 thus forming a sealed annular fluid chamber with the vanes of the respective members enclosed therein.

The base portion 76 of the stationary vaned member 42 is provided with a pair of fluid sumps 86, 87, the lower of these, 86, having an inlet port 88 for the introduction of braking fluid into the closed chamber containing the vanes, and the upper one, 87, having an outlet port 89 for the return of the brake fluid to the cooling, reservoir, and control means hereinafter described. The sump 87 communicating with the outlet port 89 is walled off by webs 90 from the lower vanes 80 of the stationary member 42, so that although fluid may flow unobstructedly from inlet port 88 beneath those vanes through triangular openings 92 provided at their bases, and toward the outlet port 89, it may not be discharged therethrough without being deflected outwardly by baffle plate 81 into the adjoining rotating vaned members 40, 41, whence it may reach the outlet port. The outer vanes 82 of the stationary member are likewise formed with apertures 93 at their bases to facilitate the flow of fluid toward the upper sump 87 and the outlet port 89. It will be understood that a wide variety of designs are possible within the scope of the present invention for the construction of the various vanes and baffle plates described for the vaned members 40, 41, 42 of the fluid brakes, and the circulation of the fluid in and through the brakes, and thus the action of the brakes, will be dependent to an extent upon such design.

In the present design it may be seen that fluid introduced through inlet port 88 into fluid sump 86 of the stationary or stator member 42 will flow along the base portion 76 through the triangular openings in the bottom of vanes 80, some of the liquid, if swiftly introduced, flowing axially outwardly from the stator member and into the moving or impeller members 40, 41. When a substantial amount of fluid has been introduced this axial flow outwardly and into contact with vanes 52, 60 of the impeller members will be general, due to the webs 90, and the flow of fluid is therefore out of the stator and into the impeller members, coming into contact with the moving cupped vanes of the latter. The impellers act as a pump and give momentum to the fluid thrown between their vanes, which momentum must be supplied by that of the moving impellers, and a braking effect on the latter is the result. The centrifugal force of the fluid in escaping from under the baffle plate 81 into the vaned impellers 40, 41 will be resolved into a flow of the fluid back to the stator in its portion above the baffle plate 81, and the free flow of fluid there is impeded by the vanes 82. The flow of the fluid thence is along baffle plate 81 through the triangular apertures at their bases and into the outlet sump 87. In the circulation of the fluid as has been described, which is due partly to the pumping action of the fluid brake unit and partly to the pressure upon the incoming fluid in seeking an outlet, the momentum of the moving members 40 and 41 is absorbed and the wheels 20, 29 of the vehicle are accordingly braked.

Cooling, reservoir and control means are provided for the fluid which is circulated through the fluid brakes already described, and as shown in Figs. 1 and 2 these means comprise a radiator 100, a tank 101 for storage of fluid, and a fluid control valve indicated generally with the numeral 102. Fluid exhaust pipes 104 connect the outlet ports 89 of the brakes to the top of the radiator 100, and a check valve 105 is inserted in each line 104 to allow the exhaust of the fluid from the brakes but not the return through these lines. The bottom of the radiator 100 communicates with the top of reservoir 101 through pipe 106, and another check valve 107 is inserted therein to prevent the backward flow of fluid into the radiator. Return pipes 110 conduct the fluid from the reservoir 101 to the inlet ports 88 of the fluid brakes, and the control valve 102 is positioned between the reservoir and these pipes to control the flow of fluid in the brakes and circulating system as hereinafter described. The exhaust and return pipes 104 and 110 respectively are preferably air and fluid tight at their various joints and termini to further the swift, dependable and efficient functioning of the fluid brakes.

Referring now in detail to the construction and operation of the fluid control valve 102, the valve casing 112 is mounted on the reservoir tank 101 by bolts 113 and communicates therewith through openings 114 and 117 in the walls of the casing and of the reservoir, respectively, while a port 115 at the bottom of the casing 112 communicates with the return pipes 110 (Figs. 11 and 12). Valve core 116 is positioned within casing 112 for rotary movement therein and has an integral stem 119 with an operating handle 118 with which the valve core 116 may be rotated to any desired position with respect to its casing 112.

The valve core 116 has a relatively large opening 120 in its cylindrical wall which, when positioned over aperture 114 in the wall of the casing 112 allows fluid communication from the reservoir tank 101 through the control valve 102 and into return pipes 110. A pair of arcuate channels 121, 122 circumferentially spaced apart from each other are located in the horizontal upper surface of valve core 116, and a vertical passage 123 in the cylindrical wall of the valve core communicates with the latter channel. The passage 123 has a port 124 to the outside of the valve core, directly beneath and spaced apart from which is the relatively small opening 125 through the valve core wall, so that when the core is turned to present the openings 124 and 125 to a depression 127 in the inner surface of the valve casing 112, channel 122 will be in communication with the inside of the valve, as shown in Fig. 12. A valve cap 128 is fixed to the top of the casing 112, and in the cap are positioned the ends of the air pipes 130, 131, 132 and 133 (Fig. 1). The pipe 130 communicates with free air; pipe 131 with the end of check valve 107 nearer the reservoir 101; pipe 132 with the top of radiator 100; and pipe 133 communicates with a suitable source of vacuum which may be furnished by the power plant of the vehicle.

In operating the fluid vehicle brakes of the present invention the operating handle 118 of the valve 102 will be associated with suitable members (not shown) to bring it conveniently under the control of the vehicle driver. When the control handle 118 is in position A, as shown in Fig. 10, the opening 114 from the reservoir 101 into valve 102 is closed by valve core 116, vacuum pipe 133 is out of communication with any part of the circulating system, and pipes 130, 131 and 132 are in communication with each other through channel 122 and with the inside of the valve through passages 123, 127 and 125. In this position free air may circulate to all parts of the fluid brake system including the vaned chambers at the vehicle wheels, while entrance of fluid is prevented. The wheels are therefore free-running and unbraked, and whatever fluid may be present in the vaned chambers at the wheels as a result of a previous operation of the brakes will be pumped out through exhaust lines 104 into radiator 100 and thence into reservoir tank 101, check valves 105 and 107 preventing a reverse flow of fluid.

To apply the fluid brakes handle 118 is moved to position B (Fig. 10), which opens port 114 to fluid from reservoir 101 and its path is unrestricted through lines 110 into the vaned chambers at the brakes through inlet ports 88. Passage 124 and opening 125 have passed beyond the depression 127 cutting off the influx of air into valve 102, and lines 130 and 131 still have communication with each other through channel 122. Pipe 132 now communicates with vacuum pipe 133 through channel 121, thus exhausting air from the brakes by applying vacuum to the top of radiator 100 and insuring rapid charging of the brakes.

Control handle 118 may now be advanced to position C, which places pipe 131 in communication with pipes 132 and vacuum pipe 133 through channel 121. Vacuum is now applied on either side of check valve 107, so that the flow of fluid through the complete circulating system and the vaned brake chambers is uninterrupted and continuous.

When control handle 118 is moved to position D vacuum pipe 133 is closed off, and the circulation of fluid through the closed system continues with a continuous pumping and braking action in the vaned chambers at the wheels.

Auxiliary friction brakes are provided for the wheels to supplement the braking action of the fluid brakes and for use as setting brakes when the vehicle is stopped. As shown in Fig. 5, a pair of flat annular brake shoes 140, 141, are mounted for axial and against rotary movement upon arms 71 of spider 70, the rectangular bars 72 being seated in axial grooves 142 provided in the inner periphery of each brake shoe. The brake shoes 140, 141 carry frictional brake lining 144 to engage the finished outer surfaces of the flat annular rings 47, 61 respectively. C-shaped brake shoe connecting members 145 are attached at one end to the outer brake shoe 141 by studs bolts 146, and on their other ends are mounted conventional hydraulic brake actuators 147 in which are seated push rods 148 attached to the inner brake shoe 140. With the construction shown and described balanced braking effort by the brake shoes 140, 141 upon the wheels 29 and 20, respectively, is assured.

The invention in its broader aspects is not limited to the specific mechanisms shown and described but departures may be made therefrom within the scope of the accompanying claims without departing from the principles of the invention and without sacrificing its chief advantages.

What I claim is:

1. Fluid braking means for a set of independently rotatable dual wheels including in combination a braking element associated for rotation with each wheel and means common to said elements for retarding rotation of said elements by fluid contact therewith.

2. Braking means for a set of independently rotatable dual wheels including in combination a braking element associated for rotation with each wheel, means for retarding rotation of said elements by fluid contact therewith, and other means for retarding rotation of said elements by frictional contact therewith.

3. Fluid braking means for a set of independently rotatable dual wheels including in combination a brake element associated for rotation with each wheel, and means common to said elements for retarding rotation of said elements by fluid contact therewith, said means including a member held against rotation, said elements and said member forming a substantially fluid tight chamber.

4. Fluid braking means for a vehicle wheel including in combination a vaned brake element associated with the wheel for coaxial rotation therewith, a stationary vaned brake member, and means forming a substantially fluid tight chamber enclosing the vanes of said element and said member, said means having a fluid inlet and a fluid outlet port therein.

5. A dual wheeled assembly including in combination a pair of coaxial independently rotatable vehicle wheels, and fluid brakes for said wheels, said brakes comprising a vaned element associated with each wheel for rotation therewith and a vaned member held against rotation, said vaned elements and vaned member forming a substantially fluid tight chamber enclosing the vanes of said elements and members.

6. A dual wheeled assembly including in combination a pair of coaxial independently rotatable vehicle wheels, and fluid brakes for said wheels, said brakes comprising a vaned element associated with each wheel for rotation therewith and a vaned member held against rotation, said vaned elements and vaned member forming a substantially fluid tight chamber enclosing the vanes of said elements and members, said vaned member having ports for the entrance and exit of braking fluid into and out of the vaned chamber.

7. A dual wheeled assembly including in combination a pair of coaxial independently rotatable vehicle wheels, and fluid brakes for said wheels, said brakes comprising a vaned element associated with each wheel, for rotation therewith, a vaned member held against rotation, said vaned elements and vaned member forming a substantially fluid tight chamber enclosing the vanes of said elements and member, said vaned member having ports for the entrance and exit of braking fluid into and out of the vaned chamber, and means under the control of the vehicle operator for selectively admitting and restricting fluid to and from the vaned chamber.

8. Fluid braking means for a set of coaxial independently rotatable dual wheels including in combination a vaned element to rotate with each wheel, a vaned member held against rotation between said elements, said vaned elements and member forming a substantially fluid tight chamber enclosing the vanes of said elements and member, said vaned member having ports for the entrance and exit of braking fluid into and out of the vaned chamber, and a circulating system for the fluid interconnecting the exit and entrance ports comprising a fluid cooling means, a fluid reservoir, and a fluid control means for selectively admitting and restricting fluid to and from the vaned chamber.

9. A dual wheeled assembly including in combination a vehicle axle, a pair of wheels mounted for coaxial independent relative rotation on the end of the axle, an annular brake element associated with each wheel for coaxial rotation therewith, said elements each having a plurality of radially extending vanes, and an annular brake member anchored to the vehicle axle between said brake elements, said brake member having a plurality of radially extending vanes, said brake elements and member forming a substantially fluid tight chamber enclosing the vanes.

10. Fluid braking means for a set of coaxial independently rotatable dual wheels including in combination a brake element for rotation with each wheel said elements each having a plurality of vanes, a brake member held against rotation between said elements having a plurality of vanes adjacent the vanes of said elements, the vanes of the brake element having apertures in their lower portions for the flow of fluid therethrough, the brake elements and the brake member forming a substantially fluid tight chamber enclosing the vanes of the elements and member, the brake member having an inlet and an outlet port for the entrance and exit of fluid to and from the chamber, and baffle plate means interconnecting the central portion of the vanes of the brake member and surrounding the outlet port whereby fluid circulating through the inlet port and out the outlet port is therebetween forced into the brake elements.

11. A dual wheeled assembly including in combination a pair of coaxial independently rotatable dual wheels, fluid brakes for said wheels comprising a vaned element associated with each wheel for rotation therewith and a vaned member held against rotation, said vaned elements and vaned member forming a substantially fluid tight chamber enclosing the vanes of said elements and member, and auxiliary friction brakes for the wheels comprising a brake shoe for each vaned element held against rotation, said brake shoes each being frictionally engageable with an outer surface of their respective elements.

12. Braking means for a set of coaxial independently rotatable dual wheels including in combination a vaned member held against rotation, a vaned element on either side of the vaned member each associated for rotation with a respective wheel, the vaned member and the vaned elements forming a substantially fluid tight chamber having an inlet and outlet port therein, means for selectively admitting and restricting the entrance of fluid into the inlet port, a pair of friction brake members each held against rotation and axially movable into frictional engagement with an outer surface of a respective vaned element, and means for moving said friction brake elements into frictional engagement with their respective vaned elements.

13. Fluid brakes for vehicle wheels including in combination a substantially fluid tight braking chamber having rotatable and non-rotatable vanes therein, said chamber having an inlet and an outlet port for the entrance thereto and exit therefrom of braking fluid, and a fluid circulating system interconnecting the inlet and outlet ports, said system comprising a fluid reservoir, means for selectively allowing and prohibiting fluid communication between the reservoir and the inlet port, means connecting the circulating system and the brake chamber with the atmosphere when said fluid communication is prohibited, and means including vacuum means for exhausting air from and charging fluid into the brake chamber when said fluid communication is allowed.

14. Control means for a fluid brake having a substantially fluid tight chamber and fluid inlet and outlet ports therein, comprising fluid circulating means connecting the inlet and outlet ports for fluid communication therebetween, and a fluid valve in the circulating means for selectively allowing and prohibiting fluid access to the inlet port, said valve including means for connecting the chamber and the circulating means with the atmosphere when fluid access is prohibited to the inlet port and means including vacuum means for exhausting air from and charging fluid into the chamber when fluid access is allowed to the inlet port.

CHARLES S. ASH.